(12) United States Patent
Dunning

(10) Patent No.: US 11,318,846 B2
(45) Date of Patent: May 3, 2022

(54) APPARATUS, SYSTEM AND METHOD FOR BRAKING

(71) Applicant: JAGUAR LAND ROVER LIMITED, Coventry (GB)

(72) Inventor: Emma-Claire Dunning, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 471 days.

(21) Appl. No.: 16/304,053

(22) PCT Filed: May 2, 2017

(86) PCT No.: PCT/EP2017/060394
§ 371 (c)(1),
(2) Date: Nov. 21, 2018

(87) PCT Pub. No.: WO2017/202576
PCT Pub. Date: Nov. 30, 2017

(65) Prior Publication Data
US 2020/0317060 A1    Oct. 8, 2020

(30) Foreign Application Priority Data

May 25, 2016  (GB) .................................... 1609156

(51) Int. Cl.
| | |
|---|---|
| *B60L 7/10* | (2006.01) |
| *B60L 58/12* | (2019.01) |
| *B60L 53/00* | (2019.01) |
| *B60L 7/26* | (2006.01) |
| *B60L 7/28* | (2006.01) |
| *B60T 1/10* | (2006.01) |

(Continued)

(52) U.S. Cl.
CPC .................. *B60L 7/10* (2013.01); *B60L 7/26* (2013.01); *B60L 7/28* (2013.01); *B60L 53/00* (2019.02);
(Continued)

(58) Field of Classification Search
CPC .... B60L 7/10; B60L 53/00; B60L 7/26; B60L 7/28; B60L 58/12; B60L 2240/12;
(Continued)

(56) References Cited

U.S. PATENT DOCUMENTS

| | | |
|---|---|---|
| 2,412,228 A | 12/1946 | Oetzel |
| 5,234,083 A | 8/1993 | Lee |

(Continued)

FOREIGN PATENT DOCUMENTS

| | | |
|---|---|---|
| CN | 2806225 Y | 8/2006 |
| CN | 2832583 Y | 11/2006 |

(Continued)

OTHER PUBLICATIONS

International Search Report on International application No. PCT/EP2017/060394, dated Jul. 11, 2017, 7 pages.

(Continued)

*Primary Examiner* — James M McPherson
*Assistant Examiner* — Kyle J Kingsland
(74) *Attorney, Agent, or Firm* — Reising Ethington P.C.

(57) ABSTRACT

An eddy current brake for a vehicle, the eddy current brake comprising a rotor, and an electromagnet arranged to receive current from an electromechanical energy generating means during braking of the vehicle and to induce an eddy current within the rotor.

18 Claims, 4 Drawing Sheets

(51) Int. Cl.
  *B60T 7/04* (2006.01)
  *B60T 8/17* (2006.01)
  *B60T 8/32* (2006.01)
  *B60T 13/58* (2006.01)
  *H02K 49/04* (2006.01)

(52) U.S. Cl.
  CPC ............... *B60L 58/12* (2019.02); *B60T 1/10* (2013.01); *B60T 7/042* (2013.01); *B60T 8/17* (2013.01); *B60T 8/3255* (2013.01); *B60T 13/586* (2013.01); *H02K 49/046* (2013.01); *B60L 2240/12* (2013.01); *B60L 2250/26* (2013.01); *B60T 2250/04* (2013.01); *B60T 2270/82* (2013.01)

(58) Field of Classification Search
  CPC .......... B60T 7/042; B60T 8/17; B60T 8/3255; B60T 13/586; H02K 49/046
  See application file for complete search history.

(56) References Cited

U.S. PATENT DOCUMENTS

| | | |
|---|---|---|
| 6,253,885 B1 | 7/2001 | Tsai et al. |
| 2004/0026191 A1 | 2/2004 | Kloft et al. |
| 2004/0035656 A1 | 2/2004 | Anwar et al. |
| 2004/0070269 A1 | 4/2004 | Anwar et al. |
| 2014/0076641 A1 | 3/2014 | Penev |

FOREIGN PATENT DOCUMENTS

| | | | | |
|---|---|---|---|---|
| CN | 104527438 A | | 4/2015 | |
| DE | 4026251 A1 | | 6/1991 | |
| DE | 102010064252 A1 | * | 1/2012 | ............ B60W 10/08 |
| EP | 2428483 A1 | * | 3/2012 | ................ B60L 7/28 |
| GB | 809353 A | | 2/1959 | |
| GB | 1305519 A | | 2/1973 | |
| JP | 2007082337 A | | 3/2007 | |
| WO | 2008028673 A1 | | 3/2008 | |

OTHER PUBLICATIONS

Written Opinion on International application No. PCT/EP2017/060394, dated Jul. 11, 2017, 12 pages.
Combined Search and Examination Report on United Kingdom application No. GB1609156.3, dated Nov. 15, 2016, 6 pages.

* cited by examiner

APPARATUS, SYSTEM AND METHOD FOR BRAKING

TECHNICAL FIELD

The present disclosure relates to an apparatus, system and method for braking. In particular, but not exclusively it relates to an apparatus, system and method for braking electric and hybrid electric vehicles using an eddy current brake.

Aspects of the invention relate to an eddy current brake, a vehicle braking system, a method for braking a vehicle, a computer program, and a vehicle.

BACKGROUND

Hybrid electric vehicles (HEVs) and electric vehicles (EVs) use electric propulsion systems comprising an electric motor to provide traction. Such motors are sometimes termed electric drive motors, electromechanical generators, electric machines or traction motors. In some examples, hybrid electric vehicles and electric vehicles use one or more batteries as an energy storage means for storing electrical energy that is to be provided to the electric drive motor to provide traction. Such batteries are sometimes termed traction batteries. In some examples, HEVs and EVs alternatively or additionally use one or more capacitors, such as provided by a supercapacitor or bank of capacitors, as an energy storage means. Subsequent examples in this disclosure are described in relation to the use of a battery as an energy storage means, but it is to be understood that such examples may alternatively or additionally employ capacitors as an energy storage means.

In addition, regenerative braking can be provided for such HEVs and EVs, to convert the kinetic energy of the moving vehicle into electrical energy, in order to provide for recharging of the battery and retardation of the vehicle as a consequence. In order to facilitate regenerative braking, the electric motor is operated as a current generating means or current generation means in the form of an electric generator, with the battery providing the load on the electric motor. The electrical energy generated during regenerative braking is stored in the battery.

EVs do not have an internal combustion engine, but have an electric motor to provide motive force to the vehicle when connected to a battery.

HEVs have an internal combustion engine in combination with an electric motor to provide motive force to the vehicle. For example, series HEVs have an electric motor to provide motive force to the vehicle and an internal combustion engine to provide generation of power for the electric motor or to recharge the battery. In another example, parallel HEVs have an electric motor to provide motive force to the vehicle and an internal combustion engine also arranged to provide motive force to the vehicle.

In EVs and series HEVs, the electric motor provides motive power to the vehicle via a drivetrain of the vehicle powertrain. The drivetrain of a vehicle powertrain comprises a transmission and front and rear pairs of wheels. The transmission is arranged to drive a pair of front wheels of the vehicle, a pair of rear wheels of the vehicle, or both the front and rear pairs of wheels of the vehicle.

In parallel HEVs both the electric motor and the internal combustion engine are connected to the transmission of the powertrain and can separately or individually provide motive power to the vehicle.

In one example of a parallel HEV, the powertrain of the vehicle includes an internal combustion engine which is releasably coupled to an electric motor in the form of a crankshaft integrated motor generator (CIMG). The internal combustion engine is releasably coupled to the CIMG by means of a clutch. The CIMG is in turn coupled to a transmission of the vehicle powertrain. The transmission is arranged to drive a pair of front wheels of the powertrain by means of a pair of front drive shafts. The powertrain also has an auxiliary driveline arranged to drive a pair of rear wheels by means of an auxiliary driveshaft and a rear differential.

An energy storage means, such as a battery, may be coupled to the CIMG in order to allow the CIMG to generate motive force in the form of torque when the CIMG is operated as a motor. The battery may be coupled to the CIMG to receive electrical energy in the form of charging current from the CIMG when the CIMG is operated as a generator in order to recharge the battery.

Under high levels of braking, such as under emergency braking conditions, where high levels of braking torque are generated, high levels of electrical energy in the form of charging current are generated by the electric motor. In many HEVs and EVs the battery is not able to accept the high level of charging current generated by the electric motor under such high levels of braking, and so it is necessary to additionally provide friction braking using, for example, conventional friction disc brakes. Furthermore friction braking may be required when the battery is fully charged, and when the vehicle is moving slowly as regenerative braking is less efficient at lower vehicle speeds.

In some systems, excess current generated under high levels of regenerative braking is provided to a current dump. For example, excess current generated under high levels of regenerative braking may be provided to braking resistor banks, sometimes called rheostatic brakes.

In some systems, excess current generated under high levels of regenerative braking is provided to heating means, for example heating elements, such as heated windscreens, and heating, ventilation and air conditioning (HVAC) systems, even when such heating means are not required, thus wasting energy that is generated by the electric motor.

It is an aim of the present invention to address disadvantages associated with the prior art.

SUMMARY OF THE INVENTION

Aspects and embodiments of the invention provide an eddy current brake, a vehicle braking system, a method for braking a vehicle, a computer program, and a vehicle, as claimed in the appended claims.

According to an aspect of the invention there is provided an eddy current brake comprising: a rotor; and an electromagnet arranged to receive current from a current generating means during braking of the rotor, and to induce an eddy current within the rotor.

According to an aspect of the invention there is provided an eddy current brake comprising: a rotor; and an electromagnet arranged to receive current from an electromechanical energy generating means during braking of the rotor, and to induce an eddy current within the rotor.

According to an aspect of the invention, there is provided an eddy current brake for a vehicle, the eddy current brake comprising: a rotor; and an electromagnet arranged to receive current from an electromechanical energy generating means during braking of the vehicle and to induce an eddy current within the rotor. This provides the advantage of providing an additional braking component and minimizes the requirements of friction braking.

The electromechanical energy generating means may be an electric motor operating as a generator during braking of the vehicle.

The electromagnet may be separated from the rotor by a small air gap. The air gap may be up to the order of a few millimetres. This provides the advantage of reducing coupling losses between the electromagnet and the rotor when inducing an eddy current in the rotor.

The electromagnet may be located at a radially outer portion of the rotor. This provides the advantage of increased eddy current generation within the rotor, since the outer portion of the rotor moves with higher speed.

According to an aspect of the invention, there is provided a vehicle braking system comprising an eddy current brake as described in any of the preceding paragraphs, and controller means arranged to control the amount of current to be provided to the electromagnet of the eddy current brake from the electromechanical energy generating means.

The controller means may be an electronic controller.

The controller means may arranged to determine an amount of current generation provided by the electromechanical energy generating means.

The controller means may be arranged to determine the amount of current to be provided to the electromagnet of the eddy current brake from the electromechanical energy generating means in dependence, at least in part, upon the current generation provided by the electromechanical energy generating means. This provides the advantage of optimizing the utilization of generated energy, in particular by ensuring that excess current generated by the electromechanical energy generating means is used to provide additional braking torque to decelerate the vehicle.

The controller means may be arranged to determine the amount of current to be provided to an energy storage means from the electromechanical energy generating means in dependence, at least in part, upon the current generation provided by the electromechanical energy generating means. This provides the advantage of optimizing the storage of generated energy within the energy storage means.

The energy storage means may comprise or may be a battery. Alternatively or additionally the energy storage means may comprise one or more capacitors, such as provided by a supercapacitor or bank of capacitors.

The controller means may be arranged to determine the amount of current to be provided to the electromagnet of the eddy current brake from the electromechanical energy generating means in dependence, at least in part, upon a current absorption limit for the energy storage means.

The controller means may be arranged to allow provision of current to the electromagnet of the eddy current brake when the current generation provided by the electromechanical energy generating means exceeds the current absorption limit for the energy storage means.

The controller means may be arranged to receive input from an energy storage state monitor providing an energy storage state value of the energy storage means.

The controller means may be arranged to determine the amount of current to be provided to the electromagnet of the eddy current brake from the electromechanical energy generating means in dependence, at least in part, upon the energy storage state value. This provides the advantage of optimizing the usage of generated energy from the electromechanical energy generating means to minimize energy wastage.

The controller means may be arranged to receive an input from a brake pedal position sensor providing a brake pedal position value corresponding to a driver demanded deceleration and to determine the amount of current to be provided to the electromagnet of the eddy current brake from the electromechanical energy generating means in dependence, at least in part, upon the brake pedal position value.

The controller means may be arranged to receive an input from a speed sensor providing a vehicle speed value, and to determine the amount of current to be provided to the electromagnet of the eddy current brake from the electromechanical energy generating means in dependence, at least in part, upon the vehicle speed value.

The vehicle braking system may comprise electromechanical energy generating means arranged to provide current to the electromagnet of the eddy current brake.

The vehicle braking system may comprise energy storage means for receiving current from the electromechanical energy generating means.

The controller means may be arranged to determine the amount of braking torque to be provided by a friction brake. The friction brake may be a hydraulic friction brake.

The friction brake may be arranged to be actuated during a braking event, prior to the eddy current brake receiving current from the electromechanical energy generating means. Alternatively or additionally, the friction brake may be actuated when the vehicle speed is below a threshold speed.

The friction brake may be actuated when the vehicle speed is less than 16 kilometres per hour (km/h). In other examples, the friction brake may be actuated at a different low vehicle speed, for example at a vehicle speed between 0 km/h and 20 km/h. In some examples the vehicle speed at which the friction brake may be actuated may be 10 km/h or 20 km/h. The speed at which the friction brake may be actuated may be dependent on the configuration of the eddy current brake arrangement.

The vehicle braking system may comprise a hydraulic friction brake comprising a caliper and brake pad, the caliper arranged to move the brake pad to be in contact with a brake disc when the hydraulic friction brake is actuated. Other mechanical vehicle braking systems may be alternatively or additionally employed to decelerate the vehicle at low vehicle speeds and/or to hold the vehicle in a stationary position.

The electromechanical energy generating means may be provided on a first vehicle axle and the eddy current brake may be provided on a second vehicle axle. This provides the advantage of providing a level of frictionless braking on a plurality of axles simultaneously, for example on both axles of a two axle vehicle.

According to an aspect of the invention, there is provided a vehicle comprising an eddy current brake as described in any of the preceding paragraphs, or a vehicle braking system as described in any of the preceding paragraphs.

According to an aspect of the invention, there is provided a method for braking a vehicle, comprising: controlling the amount of current to be provided to an electromagnet of an eddy current brake from an electromechanical energy generating means during braking of the vehicle.

The method may comprise determining an amount of current generation provided by the electromechanical energy generating means.

The method may comprise determining the amount of current to be provided to the electromagnet of the eddy current brake from the electromechanical energy generating means in dependence, at least in part, upon the current generation provided by the electromechanical energy generating means.

According to an aspect of the invention, there is provided a computer program comprising instructions that, when executed by one or more processors, cause a system to perform, at least, controlling the amount of current to be provided to an electromagnet of an eddy current brake from an electromechanical energy generating means during braking of the vehicle.

The computer program may comprise instructions that, when executed by one or more processors, cause a system to perform, at least, a method as described in any of the preceding paragraphs.

According to an aspect of the invention, there is provided a non-transitory computer readable media comprising a computer program as described in any of the preceding paragraphs.

According to an aspect of the invention, there is provided a controller means arranged to control the amount of current to be provided to an electromagnet of an eddy current brake from an electromechanical energy generating means. The current may be provided to the electromagnet of the eddy current brake from the electromechanical energy generating means without being stored in an energy storage means.

According to an aspect of the invention, there is provided a method for braking a vehicle, comprising: determining the amount of current generation provided by electromechanical energy generating means during braking of the vehicle; supplying a first portion of generated current to energy storage means; and supplying a second portion of generated current to an eddy current brake.

The current supplied to the eddy current brake may be supplied directly and/or exclusively from the electromechanical energy generating means.

According to an aspect of the invention, there is provided a method for braking a vehicle, comprising: detecting current generated by electromechanical energy generating means, which may be in the form of a motor generator, during regenerative braking of the vehicle; supplying a first portion of the detected current to energy storage means, which may be in the form of a battery, such as a traction battery; and supplying a second portion of the detected current to an eddy current brake.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
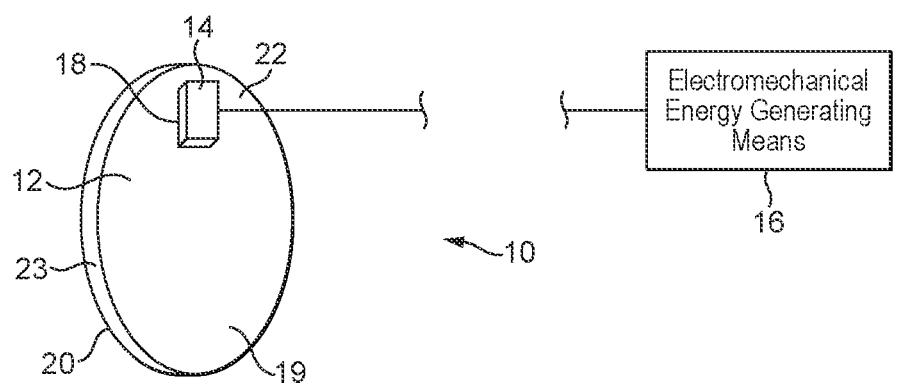
FIG. 1 illustrates an example of a eddy current brake.

Examples of the present disclosure relate to means for frictionless braking. Some examples of the present disclosure relate to frictionless braking of a vehicle. Some examples are suited to vehicles having one or more electric motors, which, when connected to an energy storage means such as a battery, can be operated to provide motive power to the vehicle and also to provide regenerative braking of a vehicle. The battery provides the power source for the electric motor, to enable the electric motor to provide motive power in the form of torque to the wheels of the vehicle. During regenerative braking of the vehicle, the electric motor is coupled to the battery and operated as an electromechanical energy generating means in the form of a generator to provide negative torque at the wheels of the vehicle. The negative torque is converted to electrical energy to be stored in the battery. The electromechanical energy generating means generates current to be provided to the battery or other components of the vehicle.

A technical effect of at least some examples of the disclosure is that energy produced by the electric motor under regenerative braking of the vehicle, which the battery is unable to accept, can be used as a source of energy for an additional frictionless braking component, thus increasing efficiency of the braking system and minimising the requirements of friction braking.

In examples of the disclosure, the vehicle has an acceleration control means, for example in the form of an accelerator pedal, by means of which the driver may request or demand a required amount of acceleration to drive the vehicle. A controller means in the form of an electronic controller controls the vehicle to provide torque from the electric motor and/or an internal combustion engine according to an energy management program executed by the electronic controller. The controller means provides for apportioning of control of one or more system components during vehicle braking.

In examples of the disclosure, the vehicle has braking control means in the form of a brake pedal, by means of which the driver may request or demand a deceleration of the vehicle. Deceleration may be effected by applying negative torque, also termed braking torque, retarding torque or decelerating torque, to the vehicle, for example at the wheels of the vehicle. A demanded deceleration may be provided, at least in part, by a regenerative braking arrangement in which the electric motor applies a negative torque to the wheels when required. In such an arrangement electric current is generated by the electric motor and is supplied to the battery, which acts as the load, for charging of the battery. If the amount of regenerative braking by the electric motor is insufficient to meet the demanded deceleration, the powertrain is operable to deploy additional braking means to slow the vehicle, which means are described below in relation to the figures.

The electronic controller may be arranged to monitor the amount of deceleration demanded by the driver by reference to a position of the brake pedal and to verify that the amount of negative torque developed by the regenerative braking arrangement and any additional braking means meets the requirements of the driver demanded deceleration. A brake pedal position sensor may be used to determine a brake pedal position value. The brake pedal position value may be equated to or indicate the amount of deceleration demanded by the driver.

A technical effect of at least some examples of the disclosure is that the requirements for friction braking are reduced such that less energy generated during braking of the vehicle is wasted in the generation of heat in the friction braking components. Consequently, wear on the friction braking components is reduced. Additionally, associated noise and/or brake dust generation may be reduced.

In examples of the disclosure, control means in the form of an electronic controller may control the amount of current to be provided to an electromagnet of an eddy current brake, in dependence, at least in part, upon the amount of current generated by the electric motor, which may for example be a CIMG, when operating as a generator.

In examples of the disclosure, the electric motor may be operable to supply current to a battery during regenerative braking of the vehicle. Batteries have a current absorption limit, which is dependent upon the battery C-rate, which is a measure of the rate at which the battery can be charged or discharged. The electric motor may provide a braking torque value corresponding to the current absorption limit of the battery.

The electric motor may provide a braking torque value which provides charging current exceeding the current absorption limit of the battery. Where the electric motor provides a braking torque value which provides charging current exceeding the current absorption limit of the battery, excess current may be provided to an additional braking means in the form of an eddy current brake.

The eddy current brake comprises a conductive rotor and an electromagnet. When electric current is provided to the electromagnet, a magnetic field is created through which the rotor passes, in use. The electromagnet induces electric current known as an eddy current in the rotor, which in turn creates a magnetic field opposing the magnetic field of the electromagnet. Thus the rotor experiences a drag force or retardation force opposing its motion. The magnitude of the retardation force is proportional to the velocity of the rotor. The inducement of the eddy current in the rotor generates heat which is then dissipated through cooling of the rotor. The cooling may be effected by convection of air over the rotor. Cooling may be improved by increasing the surface area of the rotor or venting the rotor.

The electronic controller may control the amount of current to be provided to the electromagnet of the eddy current brake from the electric motor in dependence upon a limit in the amount of current produced as a result of the braking torque generated by the electric motor that the battery can absorb. Controlling the amount of current to be provided to the electromagnet of the eddy current brake controls the amount of braking torque generated by the eddy current brake.

The electronic controller may control the amount of current to be provided to the electromagnet of the eddy current brake from the electric motor in dependence upon the state of the battery.

If the battery charge state is full, then the electronic controller may control the generation of current by the electric motor by restricting or capping the amount of current generated so there is less, or no, excess generated current. In such circumstances it may be necessary to provide brake blending where friction brakes are additionally used to provide at least a proportion of the demanded vehicle deceleration. Alternatively, or additionally, if the battery charge state is full, then the electronic controller may control more of the current generated by the electric motor to be provided to the electromagnet of the eddy current brake rather than be dissipated through a current dump, such as a resistor bank or heating means.

The electronic controller may control the amount of friction braking required in addition to any frictionless braking applied to the vehicle. In this respect, the electronic controller provides control of the apportionment of the vehicle braking torque between the various braking elements of the vehicle braking system. The apportionment of the vehicle braking torque between the various braking elements of the vehicle braking system may be called brake blending.

A technical effect of at least some examples of the disclosure is that efficient apportionment of braking torque can be provided between multiple braking elements of a vehicle braking system. This may in some embodiments assist or augment a conventional brake blending scheme. The energy efficiency of the braking system can be increased, by using excess current generation from one element of the braking system, during a braking event, to generate braking torque at another element of the braking system. By directly providing current from one element of the braking system, such as the electric motor, to another element of the braking system, such as the eddy current brake, without using current drawn from the battery, the energy efficiency of the braking system may be increased.

The figures illustrate, at least, an eddy current brake 10 for a vehicle 100, the eddy current brake 10 comprising: a rotor 12; and an electromagnet 14 arranged to receive current from an electromechanical energy generating means 16 during regenerative braking of the vehicle 100, and to induce an eddy current within the rotor 12.

FIG. 1 illustrates an eddy current brake 10 for a vehicle 100. In the example of FIG. 1, the electromechanical energy generating means 16 is an electric motor which may operate as a generator during vehicle braking. That is, an electrical load in the form of a battery may be operatively connected to the electric motor 16 during braking of the vehicle, such that electric current may be generated by the electrical motor and provided to the battery to be stored therein. The electric motor 16 may be a CIMG.

The rotor 12 comprises a disc of conductive material. In some examples the rotor 12 may be a non-ferromagnetic material. In other examples the rotor 12 may be a ferromagnetic material. For example, the rotor 12 may be formed of aluminium, cast iron or any other conductive material.

The electromagnet 14 of the eddy current brake 10 may be separated from the rotor 12 by a small air gap 18. The small air gap 18 should be sufficient to allow the rotor 12 to rotate freely of the electromagnet 14. The air gap 18 may be up to a few millimetres. For example, the air gap 18 may be between 0.1 and 2 mm. The eddy current brake 10 may comprise one or more electromagnets 14. One or more electromagnets 14 may be positioned on a first side 19 of the rotor 12. In some examples, one or more electromagnets 14 may be additionally positioned on a second side 20 of the rotor 12. The first side 19 of the rotor 12 and second side 20 of the rotor 12 may be opposing circular faces of the rotor 12. In other examples, the first side 19 of the rotor 12 and second side 20 of the rotor 12 may be opposing toroidal faces of the rotor 12.

At least one electromagnet 14 may be located at a radially outer portion 22 of the rotor 12. By being positioned at a radially outer portion 22 of the rotor 12, the electromagnet 14 can induce current into the rotor 12 over a larger surface area per revolution of the rotor 12, than would be possible if the electromagnet 14 were positioned at an inner portion of the rotor 12.

Since the radially outer portion 22 of the rotor 12 has a higher velocity than the radially inner portion of the rotor 12, then the magnitude of the retardation force generated is higher when the at least one electromagnet 14 is positioned at an outer portion 22 of the rotor 12 in comparison to the at least one electromagnet 14 being positioned at an inner portion of the rotor 12.

Further, since the radially outer portion 22 of the rotor 12 has a higher velocity than the inner portion of the rotor 12, then air cooling of the outer portion may be more efficient. In some examples the at least one electromagnet 14 may be positioned parallel to a circular or toroidal face 19 of the rotor 12 to induce an eddy current in the rotor 12 relative to the circular or toroidal face 19 of the rotor 12. In some examples at least one electromagnet 14 may alternatively or additionally be positioned at an outer circumference of the rotor 12 to induce an eddy current in the rotor 12 relative to the circumferential surface 23 of the rotor 12. For example, the at least one electromagnet 14 may be positioned perpendicular to the normal of the circumferential edge 23 of the rotor 12.

The figures illustrate, at least, a vehicle braking system 50 comprising an eddy current brake 10 for a vehicle 100, the eddy current brake 10 comprising: a rotor 12; and an electromagnet 14 arranged to receive current from an electromechanical energy generating means 16 during regenerative braking of the vehicle 100, and to induce an eddy current within the rotor 12, and controller means 24 arranged to control the amount of current to be provided to the electromagnet 14 of the eddy current brake 10 from the electromechanical energy generating means 16. Therefore the controller means 24 may be arranged to control the amount of braking torque to be provided by the eddy current brake 10.

Figure 2:
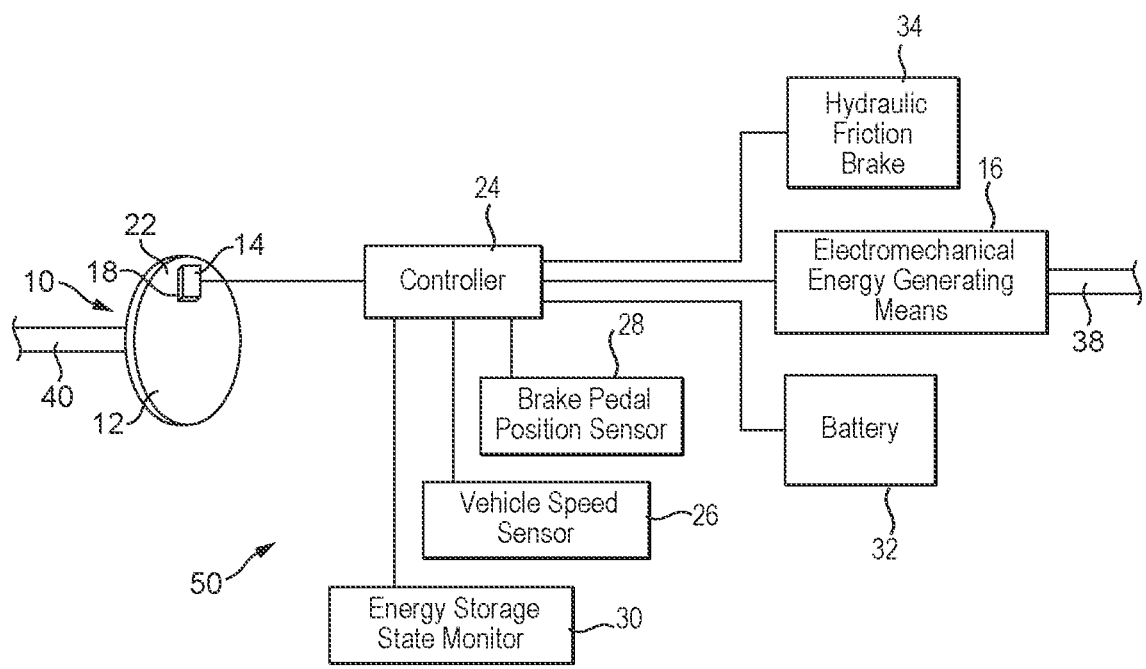
FIG. 2 illustrates an example of a system.

FIG. 2 illustrates a schematic arrangement of a vehicle braking system 50. In FIG. 2 the vehicle braking system 50 comprises an eddy current brake 10 comprising a rotor 12 and an electromagnet 14 arranged to receive current from an electromechanical energy generating means 16 in the form of an electric motor, during regenerative braking of the vehicle 100, as described above in relation to FIG. 1.

The vehicle braking system 50 of FIG. 2 comprises controller means 24 in the form of an electronic controller 24 arranged to determine the amount of current to be provided to the electromagnet 14 of the eddy current brake 10. The electronic controller may be arranged to determine the amount of current generation provided by the electric motor 16 such that the electronic controller 24 may determine the amount of current to be provided to the electromagnet 14 of the eddy current brake 10. The vehicle braking system 50 of FIG. 2 also comprises a hydraulic friction brake 34, though it will be understood by the skilled person that another form of mechanical braking arrangement may be provided instead of, or in addition to, a hydraulic friction brake 34. For example, an electrically actuated friction brake, or pneumatic friction brake may be provided.

The electromechanical energy generating means 16 may be provided on a first vehicle axle 38 and the eddy current brake 10 may be provided on a second vehicle axle 40. When the electromechanical energy generating means 16 and the eddy current brake 10 are provided on different axles, a level of frictionless braking can be provided on two axles simultaneously. This may provide for a more stable braking regime. This may provide for a better distribution of brake balance to minimise or avoid wheel locking during braking of the vehicle, especially during emergency braking events. In other examples the electromechanical energy generating means 16 and the eddy current brake 10 may be provided on the same axle. In other examples both an electromechanical energy generating means 16 and an eddy current brake 10 may be provided on a plurality of axles.

In the example of FIG. 2, the electronic controller 24 apportions the requirements of braking torque from various components of the vehicle braking system 50, the various components of the vehicle braking system 50 comprising an electric motor 16, an eddy current brake 10, and a hydraulic friction brake 34, each of which can be operated to provide braking torque. The electronic controller 24 apportions the requirements of braking torque from various components of the vehicle braking system 50 based on inputs from one or more of a brake pedal position sensor 28, a vehicle speed sensor 26 and an energy storage means state sensor or energy storage state monitor 30.

The electronic controller 24 apportions the requirements of braking torque for each of the electric motor 16, the eddy current brake 10, and the hydraulic friction brake 34 between zero torque and an upper limit, such upper limits being understood by the skilled person to be dependent upon the arrangement of the respective components of the vehicle braking system 50.

For example the limit of braking torque that can be provided by the electric motor 16 may be dependent, at least in part, on, or determined, at least in part, by, the C-value of a battery 32 connected to the electric motor 16, that is, at least in part on or by the battery current absorption limit. The limit may also be dependent upon the current absorption limit of other connected components, which may include the eddy current brake 10 and/or current dump and/or heating means.

The limit in braking torque that can be provided by the eddy current brake may be determined by a current limit of the electromagnet 14 and/or by the ability of the eddy current brake to dissipate heat generated during eddy current braking.

The limit of braking torque that can be provided by the hydraulic friction brake 34 may be provided by a hydraulic pressure limit of the hydraulic braking system and/or by the ability of the hydraulic friction brake 34 to dissipate heat generated during friction braking. Other systems such as an anti-lock braking system (ABS) may affect the functionality of the hydraulic friction brake 34.

In operation, the vehicle 100 will be travelling at a speed S prior to the driver demanding deceleration, retardation or braking of the vehicle 100.

The driver may demand a retardation of the vehicle 100 by applying a force to braking control means in the form of a vehicle brake pedal. The electronic controller 24 receives an input from a brake pedal position sensor 28 associated with the vehicle brake pedal and calculates a required braking torque.

The electronic controller 24 receives an input from an energy storage state monitor 30. The energy storage state monitor 30 is in the form of a battery state monitor or battery state sensor. The battery state monitor 30 may output a voltage level, current integration value, or other state of charge value for determination of the battery state by the electronic controller, or be arranged or configured to output a determination of battery state. The battery state monitor 30 or the electronic controller 24 determines if the battery is in a state in which it can accept further charging by the electric motor 16 under regenerative braking conditions.

If the required braking torque is less than a value which would generate current above the battery current absorption limit and the battery 32 is in a state where it is able to accept charging by the electric motor 16, then the electronic controller 24 will demand that the electric motor 16 provide all, or substantially all, of the driver demanded deceleration, by providing braking torque.

If however the battery 32 is not in a state where it is able to accept charging by the electric motor 16, or that the required braking torque would generate a current above the battery current absorption limit, then the electronic controller 24 will apportion braking torque between the electric motor 16 and the eddy current brake 10 to meet the driver demanded deceleration.

If the battery 32 is unable to accept charging by the electric motor 16 then a greater proportion of the braking torque will be provided by the eddy current brake 10. In some examples, the eddy current brake 10 may provide all, or substantially all, of the braking torque to meet the driver demanded deceleration. In other examples, the proportion of the braking torque provided by the eddy current brake 10 may be less than all, or substantially all, of the braking torque required to meet the driver demanded deceleration.

If the eddy current brake 10 is providing its maximum braking torque at a given vehicle speed, which may be limited by heat capacity and/or current handling capacity of the eddy current brake 10, such that the eddy current brake cannot supply all of the braking torque requested of it by the electronic controller, but the battery 32 is unable to accept charging by the electric motor 16, then the electric motor 16 may operate to generate current to produce braking torque but the electronic controller 24 may operate to divert excess generated current from the electric motor 16 to dissipate the excess generated current through operation of various electric heating systems of the vehicle, such as screen heaters or HVAC systems, and/or via a current dump such as a dedicated braking resistor bank.

In some examples, in addition to the eddy current brake 10 and the electric motor 16 providing braking torque, a portion of the braking torque may be provided by a friction brake 34, such as a hydraulic friction brake. In other examples, the friction brake 34 may be operable by electrical or pneumatic means.

The use of friction brakes 34 may be required at high speeds when the combination of braking torque from the electric motor 16 and braking torque from the eddy current brake 10 are unable to provide sufficient braking torque to meet the driver demanded deceleration.

In some arrangements, friction brakes 34 may additionally or alternatively be required at low speeds if the combination of the regenerative brakes using an electric motor 16, and the eddy current brakes 10, do not have the ability to operate at very low speeds to bring a vehicle to a full stop.

Some arrangements of electric motors 16, such as switched reluctance motors, have a zero rpm rotation holding capability to provide a vehicle holding capacity. However, such motors require a continuous supply of energy to operate. Other forms of electric motors 16 do not have a vehicle holding capacity, and therefore require additional friction brakes 34 to provide a vehicle holding capacity.

As will be explained in more detail below, the various components of the vehicle braking system 50 may provide braking torque through different modes of operation.

It is to be understood that friction forces between vehicle components, friction forces between the tyres of the vehicle 100 and the surface on which the vehicle 100 is travelling, and engine braking in vehicles 100 having an internal combustion engine connected to the vehicle drivetrain, will provide some braking torque and cause the vehicle speed to reduce even without application of driver demanded deceleration, that is, the vehicle 100 may undergo deceleration without the brake pedal being depressed. Such deceleration may be dependent on the gradient of the surface on which the vehicle 100 is travelling. Such deceleration may be dependent on whether any acceleration force is being applied to the vehicle 100, for example through the use of a driver operated accelerator pedal.

However, in order to simplify the explanation of the deceleration of the vehicle 100 with respect to examples of the present invention, frictional effects are considered negligible. Furthermore, the vehicle 100 is considered to be travelling on a level surface. Additionally, it is considered that no acceleration force is being demanded by the driver, for example thorough depression of a driver operated accelerator pedal.

In examples of the disclosure, as illustrated by the vehicle braking system 50 of FIG. 2, the electric motor 16 is able to provide braking torque under two operating modes.

Firstly, when the electric motor 16 is operating as a generator such that it is generating current which is below the current absorption limit of the battery 32, then the operation of the electric motor 16 as a generator provides all, or substantially all, of the driver demanded deceleration.

Secondly, when the electric motor 16 is operating as a generator but is generating current at which is above the current absorption limit of the battery 32 then the electric motor 16 provides the current over the current absorption limit of the battery 32 to the eddy current brake 10. This current is provided directly to the eddy current brake 10 as the battery 32 is unable to accept the additional current. That is, current provided by the electric motor 16 is provided to the eddy current brake 10 without being first stored in the battery 32. The current provided to the eddy current brake 10 may therefore come exclusively from, and consist of, current from the electric motor 16. This provides the advantage of minimizing any delay in the application of the eddy current brake 10. The eddy current brake 10 therefore effectively acts as a load on the electric motor 16 thereby providing braking torque. In the latter mode, the eddy current brake 10 itself provides additional braking torque by using the current input from the electric motor 16 to generate an electric field in the eddy current brake rotor 12, which opposes the electric field of the electromagnet 14 of the eddy current brake 10.

This latter mode of the electric motor 16 therefore provides a compound braking torque action, reducing the need for excess current generated by the electric motor 16 to be dissipated through heating means or a current dump and/or the need to apply friction brakes 34, whilst meeting the driver demanded deceleration.

In some examples it may be necessary to employ the eddy current brake 10 with less than all i.e., less than 100%, of its operating current being received from the electric motor 16. In such circumstances, the eddy current brake 10 is alternatively or additionally arranged to draw current from the battery 32 in order to provide the desired energization of the electromagnet 14. The electronic controller 24 may operate the eddy current brake 10 in this way to retard the vehicle 100 when the vehicle 100 is travelling at very high speeds as the regenerative brakes may provide insufficient braking torque at very high speeds. The regenerative brakes may also provide insufficient current to the eddy current brake 10 to meet the driver demanded deceleration. As vehicle speed reduces, then the eddy current brake 10 can receive all, or substantially all, of its operating current from the electric motor 16 rather than receiving some or all of its operating current from the battery 32.

The electronic controller 24 may receive input from a speed sensor 26 which may be used in the apportioning of levels of braking torque of each braking component of the vehicle braking system 50. In some examples, the electronic controller 24 can access a look up table, held in a memory, to correlate vehicle speed values and brake pedal position values in order to assist in the determination of the apportioning of braking torque between each braking component of the vehicle braking system 50.

Figure 3:
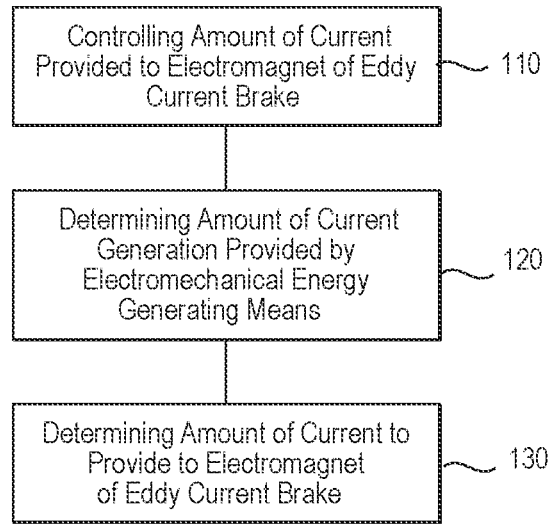
FIG. 3 illustrates an example of a method.

FIG. 3 illustrates a method of braking a vehicle. In particular, FIG. 3 illustrates a method of braking a vehicle 100, wherein the vehicle comprises a vehicle braking system as described herein. At block 110, the method comprises controlling the amount of current to be provided to an electromagnet 14 of an eddy current brake 10 from an electromechanical energy generating means 16 during braking of the vehicle 100. At block 120, the method comprises determining an amount of current generation provided by the electromechanical energy generating means 16. At block 130, the method comprises determining the amount of current to be provided to the electromagnet 14 of the eddy current brake 10 from the electromechanical energy generating means 16 in dependence, at least in part, upon the current generation provided by the electromechanical energy generating means 16.

In some examples, further blocks of the method may be provided to perform other functions as defined above in relation to the described system.

In some examples, the method comprises determining the current generation provided by electromechanical energy generating means 16, for example an electric motor, during braking of the vehicle 100. The method may provide for determining an amount of current to be provided to an electromagnet 14 of an eddy current brake 10 from an electromechanical energy generating means 16. This determines the magnitude of the eddy current induced in the rotor 12 of the eddy current brake 10, thus influencing the braking torque provided by the eddy current brake 10. The method may comprise supplying a first portion of generated current, provided by the electromechanical energy generating means 16, to the eddy current brake 10 and supplying a second portion of generated current, provided by the electromechanical energy generating means 16, to an energy storage means 32, for example a battery. When current is supplied, under braking, to the energy storage means 32 the braking is considered to be regenerative braking.

In examples of methods provided for by the herein described vehicle braking system, comprising an electronic controller 24, a driver demanded deceleration may be detected. In order to meet the driver demanded deceleration, the electronic controller 24 may apportion a first portion of required braking torque to an electromechanical energy generating means 16 and apportion a second portion of required braking torque to an eddy current brake 10, wherein a first portion of the current generated by the electromechanical energy generating means 16 is supplied to an eddy current brake 10 and a second portion of current generated by the electromechanical energy generating means 16 is supplied to an energy storage means 32.

Figure 4:
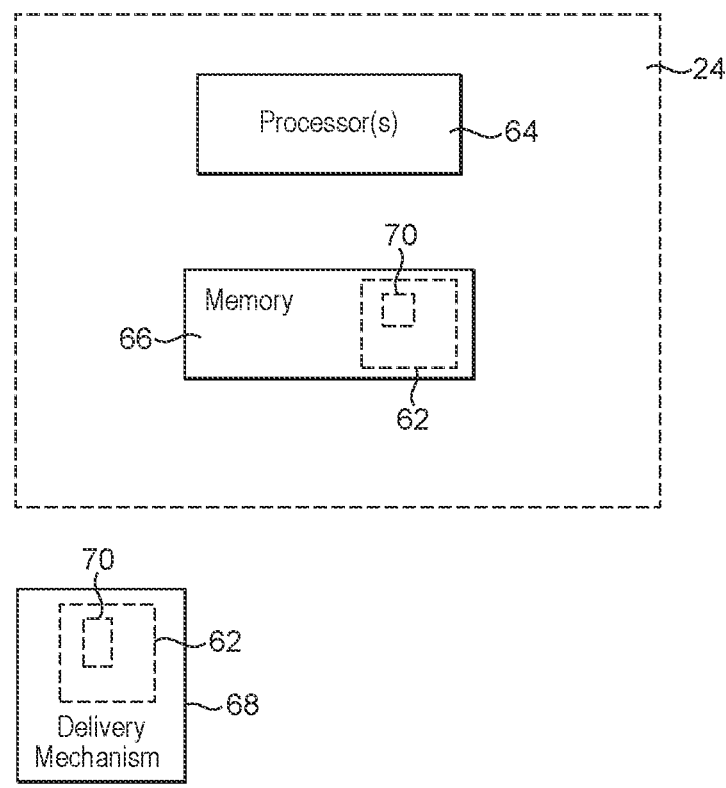
FIG. 4 illustrates an example of a system.

FIG. 4 illustrates a computer program 62 comprising instructions 70 that, when executed by one or more processors 64, cause a system to perform, at least one of the aforementioned methods. For example the system may be caused to perform, at least: controlling the amount of current to be provided to an electromagnet of an eddy current brake from an electromechanical energy generating means 16 during braking of the vehicle.

FIG. 4 illustrates an example of a controller means 24 that may be a chip or a chipset. The controller means 24 may form part of one or more systems comprised in a vehicle 100. For example the controller means 24 may form part of a vehicle braking control system 50, such as the one illustrated in the example of FIG. 2.

Implementation of a controller means 24 may be as controller circuitry. The controller means 24 may be implemented in hardware alone, have certain aspects in software including firmware alone or can be a combination of hardware and software (including firmware).

As illustrated in FIG. 4 the controller means 24 may be implemented using instructions that enable hardware functionality, for example, by using executable instructions of a computer program 62 in a general-purpose or special-purpose processor 64 that may be stored on a computer readable storage medium (disk, memory etc.) to be executed by such a processor 64.

The processor 64 is configured to read from and write to the memory 66. The processor 64 may also comprise an output interface via which data and/or commands are output by the processor 64 and an input interface via which data and/or commands are input to the processor 64.

The memory 66 stores a computer program 62 comprising computer program instructions (computer program code) that controls the operation of the controller means 24 when loaded into the processor 64. The computer program instructions 70, of the computer program 62, provide the logic and routines that enables the apparatus to perform the methods illustrated in FIG. 3. The processor 64 by reading the memory 66 is able to load and execute the computer program 62.

The controller means 24 therefore comprises: at least one processor 64; and at least one memory 66 including computer program code, the at least one memory 66 and the computer program code configured to, with the at least one processor 64, cause the controller means 24 at least to perform: controlling the amount of current to be provided to an electromagnet of an eddy current brake from an electromechanical energy generating means 16 during braking of the vehicle.

As illustrated in FIG. 4, the computer program 62 may arrive at the controller means 24 via any suitable delivery mechanism 68. The delivery mechanism 68 may be, for example, a non-transitory computer-readable storage medium, a computer program product, a memory device, a record medium such as a compact disc read-only memory (CD-ROM) or digital versatile disc (DVD), or an article of manufacture that tangibly embodies the computer program 62. The delivery mechanism may be a signal configured to reliably transfer the computer program 62. The controller means 24 may propagate or transmit the computer program 62 as a computer data signal.

Although the memory 66 is illustrated as a single component/circuitry it may be implemented as one or more separate components/circuitry some or all of which may be integrated/removable and/or may provide permanent/semi-permanent/dynamic/cached storage.

Although the processor 64 is illustrated as a single component/circuitry it may be implemented as one or more separate components/circuitry some or all of which may be integrated/removable. The processor 64 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The blocks illustrated in the FIG. 3 may represent steps in a method and/or sections of code in the computer program 62. The illustration of a particular order to the blocks does not necessarily imply that there is a required or preferred order for the blocks and the order and arrangement of the block may be varied. Furthermore, it may be possible for some blocks to be omitted.

In examples, the vehicle braking system 50 of FIG. 2, or the controller means 24 of FIG. 4 provides means for performing the methods illustrated in FIG. 3 and as described herein.

The operation of a non-limiting example of the invention will now be described with respect to FIGS. 5, 6 and 7.

Figure 5:
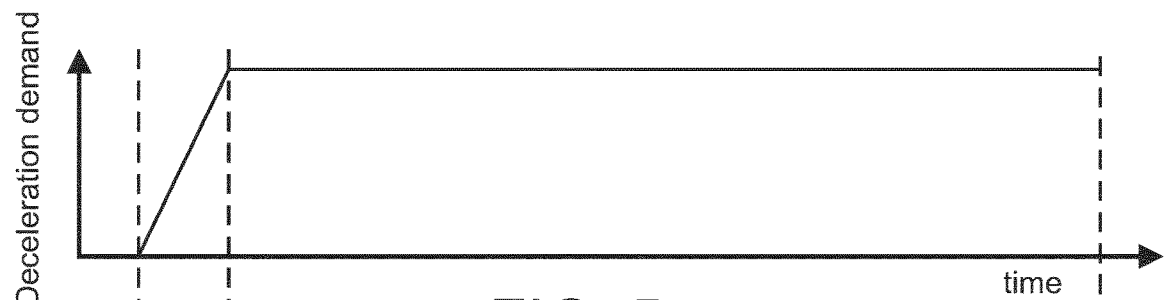
FIG. 5 illustrates an example deceleration demand graph.

FIG. 5 illustrates an example of a graph of deceleration demand against time. FIG. 6 illustrates a graph of vehicle speed against time. FIG. 7 illustrates a graph of braking torque against time. The time axis (x axis) on each of the graphs of FIGS. 5, 6 and 7 correlates to the time axis on each of the other two graphs. Therefore, timings on one graph can be correlated to timings on each of the other two graphs.

Figure 6:
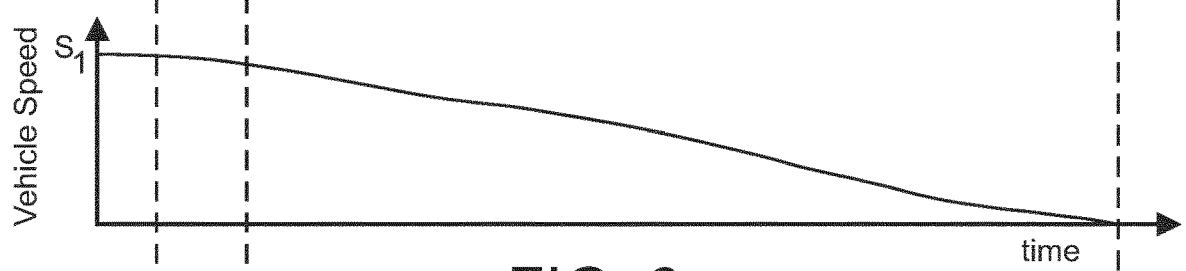
FIG. 6 illustrates an example vehicle speed graph.
Figure 7:
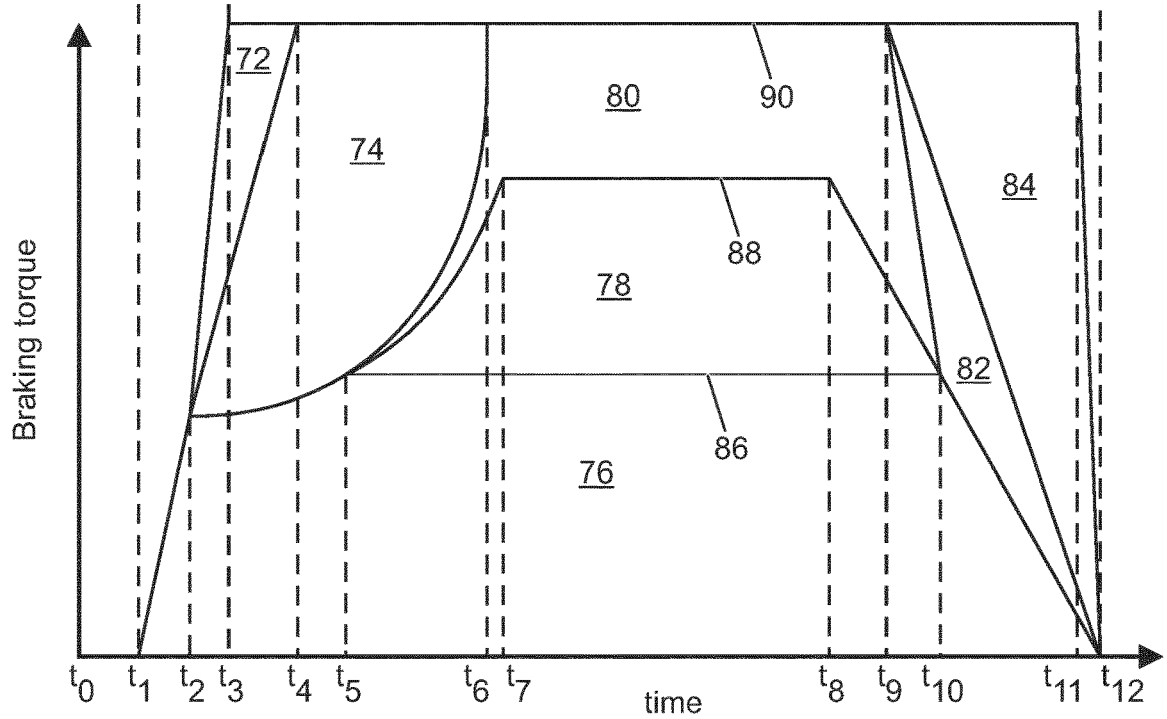
FIG. 7 illustrates an example braking torque graph.
Figure 8:
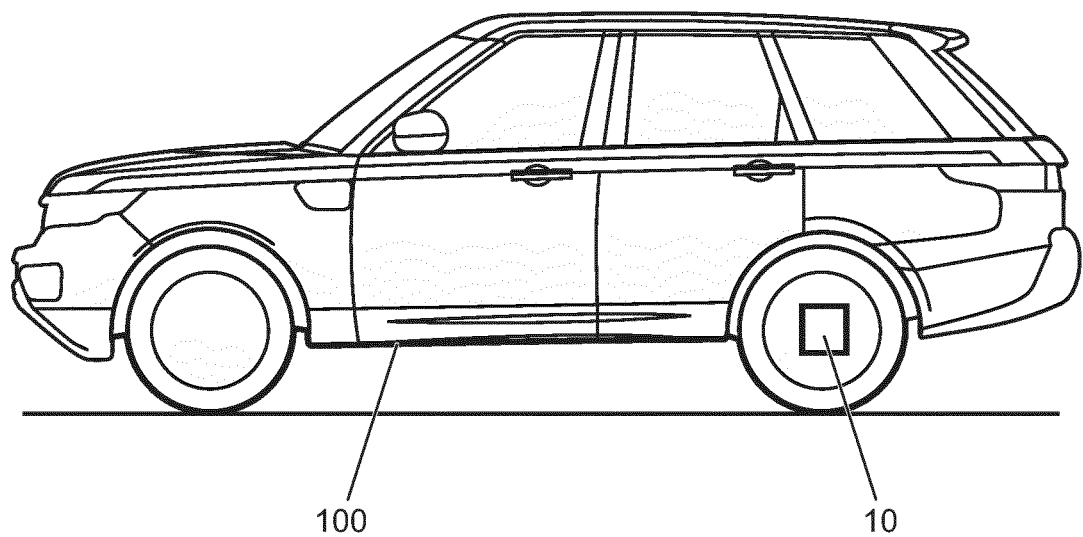
FIG. 8 illustrates an example of a vehicle.

In the example illustrated by FIGS. 5, 6 and 7, the vehicle is initially progressing at a speed $S_1$ at time $t_0$. At a subsequent time $t_{12}$ the vehicle speed has reduced to zero. That is, at time $t_{12}$ the vehicle is stationary. It will be understood that the example illustrated in FIGS. 5, 6 and 7 are merely illustrative of one example of the operation of the invention, and that in other examples, the braking of the vehicle will follow different patterns, affecting the braking torque apportionment from the different components of the described system. In other examples the vehicle may be slowed by the application of a brake pedal, but not necessarily stopped.

FIG. 5 shows one example of deceleration demand against time. The driver of the vehicle 100 may demand a particular level of vehicle deceleration or retardation by applying a force to braking means. For example, the driver of the vehicle may demand a particular level of vehicle deceleration by applying a force to a brake pedal of the vehicle to depress the brake pedal. In the example shown in FIG. 5, between time $t_0$ and $t_1$ the vehicle travels at a constant speed $S_1$, whilst the brake pedal is not depressed.

The driver begins to apply force to the brake pedal at time $t_1$. Between time $t_1$ and $t_3$ the driver increases the depression of the brake pedal. FIG. 5 shows the increase in depression of the brake pedal to follow a linear progression over time between $t_1$ and $t_3$, however, in other examples the increase in depression of the brake pedal may follow a non-linear progression. Between time $t_3$ and time $t_{12}$ the depression of the brake pedal remains constant. In other non-illustrated examples, between time $t_3$ and time $t_{12}$ the depression of the brake pedal may fluctuate between different levels. The depression of the brake pedal may be at a level between 0% and 100% depression or fluctuate between levels of depression between 0% and 100% depression. The level of brake pedal depression may be monitored by a brake pedal position sensor 28.

FIG. 6 shows the speed of the vehicle 100 between time $t_0$ and time $t_{12}$. In particular FIG. 6 shows the speed of the vehicle 100 in response to the deceleration demand as shown in FIG. 5. Between time $t_0$ and $t_1$ the vehicle 100 travels at a constant speed $S_1$, whilst the brake pedal is not depressed, that is, the vehicle 100 does not exhibit any driver demanded deceleration when there is no force applied to the brake pedal.

It will of course be understood that various frictional forces may cause the vehicle 100 to slow down without the application of a driver demanded deceleration. However, for the purposes of the described examples of the invention, frictional forces are assumed to be zero.

When the brake pedal is begun to be depressed at time $t_1$ the vehicle 100 begins to decelerate. Between time $t_1$ and $t_3$ an increasing braking force is applied to the vehicle 100 and the vehicle 100 decelerates. Between time $t_3$ and $t_{12}$ the vehicle 100 is subjected to a deceleration force dependent on the level of depression of the brake pedal.

FIG. 7 shows the components of braking torque in an example system according to the present invention. The person skilled in the art would understand that the arrangement of the components of braking torque may be modified without departing from the scope of the invention.

In the example shown in FIG. 7, at time $t_0$ no braking torque is applied, as there is no driver demanded deceleration. At time $t_1$, when the brake pedal is begun to be depressed, the vehicle 100 is controlled to begin deceleration.

Between time $t_1$ and $t_2$, where the brake pedal has not yet reached its intended final depression level, the amount of braking torque can be provided by the electric motor 16 alone. In this period of time, the battery 32 may absorb the energy generated by the electric motor 16, thus providing regenerative braking.

At time $t_2$ the amount of driver demanded deceleration increases further through further depression of the brake pedal. Beyond time $t_2$ the battery 32 is unable to absorb all of the additional energy generated by the electric motor 16 under the increased deceleration condition. In order to effect the higher deceleration required at time $t_2$ further braking torque is provided by the friction brake 34. Additionally, in order to effect the higher deceleration required at time $t_2$ further braking torque is provided by the eddy current brake 10, where the eddy current brake 10 is supplied with electrical energy from the battery 32 to induce an eddy current in the rotor 12 to provide the additional braking torque.

At time $t_3$ the brake pedal has reached its intended final depression level, which may be for example a 100% depression level under emergency braking. At this time a significant amount of braking torque is being provided by the friction brake 34.

Between time $t_3$ and $t_4$, the amount of braking torque provided by the friction brake 34 reduces. At time $t_4$ the amount of braking torque provided by the friction brake 34 is zero. Between time $t_3$ and $t_4$ the amount of braking torque provided by the eddy current brake 10 increases. The eddy current brake 10 between time $t_3$ and time $t_4$ operates by being provided with energy from the battery 32 in order to induce an eddy current in the rotor 12. At the same time, there is a small increase in braking torque provided by the electric motor 16, since energy from the battery 32 is being used to supply the eddy current brake 10.

Between time $t_4$ and time $t_5$ all of the braking torque is being provided by the eddy current brake 10 which is being supplied with energy from the battery 32, and the electric motor 16 with the battery 32 as the load, i.e., to effect regenerative braking.

At time $t_5$ the electric motor 16 is at a level of braking torque generation where the battery 32 has reached its maximum rate of energy absorption. Between time $t_5$ and $t_6$ the electric motor 16 generates more energy than can be absorbed by the battery 32. The excess energy from the electric motor 16 regenerative braking is then absorbed by the eddy current brake 10 with a corresponding decrease in the requirement of energy from the battery 32 required for the eddy current brake 10 operation. Thus between time $t_5$ and $t_6$ excess electrical energy that the battery 32 cannot absorb is provided to the eddy current brake 10 to assist with vehicle deceleration. Between time $t_5$ and $t_6$ the eddy current brake 10 provides braking torque from energy supplied by both the battery 32 and the electric motor 16.

This provides at least a partially self-compounding braking action, and enables more efficient frictionless braking, than is provided by the use of electric motor 16 regenerative braking alone.

At time $t_6$ the electric motor 16 is still at a level of braking torque generation where the battery 32 is at its maximum rate of energy absorption. At time $t_6$ the eddy current brake 10 no longer utilises energy from the battery 32 to provide braking effect, but is supplied entirely by the excess energy generated by the electric motor 16 that the battery 32 is unable to absorb. This provides a self-compounding braking action, and enables more efficient frictionless braking, than is provided by the use of electric motor 16 regenerative braking alone.

At time $t_7$ the electric motor 16 is still at a level of braking torque generation where the battery 32 is at its maximum rate of energy absorption. At time $t_7$ the electric motor 16 has also reached its maximum braking torque generation level. This condition exists until time $t_8$. Between time $t_7$ and time $t_8$ the eddy current brake 10 is wholly supplied with energy from the electric motor 16 and does not use energy from the battery 32. Consequently there is greater frictionless braking effect without using energy from the battery 32. Further because of the combination of braking effect from the regenerative braking of the electric motor 16 and the braking effect from the eddy current brake 10, there is less need to apply friction brakes 34 during the braking phase of the vehicle 100.

At time $t_8$ the vehicle speed has reduced such that the energy generated through braking has decreased to such a level that the electric motor 16 is no longer at its maximum braking torque generation level. Thus between time $t_8$ and time $t_9$ less energy is available to supply the eddy current brake 10 directly from the electric motor 16. Therefore energy from the battery 32 is used to supplement the energy from the electric motor 16 in supplying the eddy current brake 10 with energy for braking.

At time $t_9$ the speed of the vehicle 100 has been reduced to a level where the efficiency of the eddy current brake 10 and the electric motor 16 is reduced requiring the intervention of friction brakes 34. Such a vehicle speed may be, for example, between 10 km/h and 20 km/h. This requirement increases as the vehicle 100 slows to a stop as the eddy current brake 10 and electric motor 16 regenerative braking efficiencies decrease further. It is noted that neither the eddy current brake 10 nor electric motor 16 regenerative braking can be used to hold the vehicle 100 in a stationary position, therefore friction brakes 34, or some other mechanical means are required to hold the vehicle 100 in such a stationary condition. Alternatively, a switched reluctance motor can be used as the electric motor to provide a zero revolution per minute holding capability to provide a vehicle holding capacity.

At time $t_{10}$ the electric motor 16 has once again reached the level of braking torque generation where the battery 32 is at its maximum rate of energy absorption. At time $t_{10}$) the eddy current brake 10 is then no longer supplied with energy from the electric motor 16, and so the eddy current brake 10 is operated using energy from the battery 32 only.

Between time $t_{10}$ and time $t_{11}$ the braking torque provided by the electric motor 16 during regenerative braking continues to reduce as the vehicle speed reduces. Therefore the battery 32 is operating below its maximum rate of energy absorption, such that there is no excess energy to be provided to the eddy current brake 10. Between time $t_{10}$) and time $t_{11}$ the eddy current brake 10 is supplied with energy from the battery 32 only. Between time $t_{10}$ and time $t_{11}$ the braking torque provided by the eddy current brake 10, being supplied with energy from the battery 32, also reduces as the vehicle speed reduces. Correspondingly, between time $t_{10}$ and time $t_{11}$ the braking torque provided by the friction brake 34 increases to account for the reduction in braking torque from the electric motor 16 in regenerative braking mode and eddy current brake 10.

At time $t_{11}$, the speed of the vehicle 100 is reduced to a level where the braking torque from the friction brake 34 begins to reduce. Between time $t_{11}$ and $t_{12}$ the braking torque from the friction brake 34 reduces down to zero at $t_{12}$ where the vehicle speed reaches zero. Likewise the braking torque from the electric motor 16 and the eddy current brake 10 reach zero by at least $t_{12}$.

Alternatively, FIG. 7 can be described in relation to the areas under the graph, 72, 74, 76, 78, 80, 82 and 82, and the horizontal lines 86, 88, 90, forming discrete areas of deceleration. FIG. 7 illustrates how the electronic controller 24 apportions braking force or torque to different components of the vehicle braking system during a typical braking to stop from high speed. A high speed may be a speed above 60 miles per hour (mph) or 96 kilometres per hour (km/h).

Area 72 represents a braking force which is being provided by friction brakes 34.

Area 74 represents a braking force which is being provided by the eddy current brake 10, where the current supplied to the eddy current brake 10 is provided by the battery 32.

Area 76 represents a braking force which is being provided by the electric motor 16, such as a traction motor, operated as a generator to supply current to the battery 32 to provide regenerative braking. Therefore area 76 represents a braking force where energy is absorbed by the battery 32.

Area 78 represents a braking force which is being provided by the electric motor 16, where current is being provided from the electric motor 16 to the eddy current brake 10. Therefore area 78 represents a braking force where energy is absorbed by the eddy current brake 10.

Area 80 represents a braking force which is being provided by the eddy current brake 10, where current is supplied to the eddy current brake 10 from the electric motor 16 to induce an eddy current in the rotor 12 of the eddy current brake 10. Therefore area 80 represents a braking force where energy is being supplied to the eddy current brake 10 from the electric motor regenerative braking.

Area 82 represents a braking force which is being provided by the eddy current brake 10, where the current supplied to the eddy current brake 10 is provided by the battery 32.

Area 84 represents a braking force which is being provided by friction brakes 34.

Line 86 represents a level of regenerative braking force from the electric motor 16 where the electrical energy generated is the maximum that the battery 32 can absorb. Line 88 represents the maximum regenerative braking force from the electric motor 16. Line 90 represents the braking force required to meet the driver demanded deceleration.

At high speed (for example above 96 km/h), regenerative braking torque from the electric motor 16 may be suboptimal due to the torque curve characteristics of the electric motor 16 and any associated gearing used. At mid-range speeds (for example below 96 km/h and above 32 km/h) the regenerative braking torque of the electric motor 16 will be increasing due to the maximum torque characteristics of the electric motor 16 being below the maximum rpm of the electric motor 16. At these mid-range speeds more current is generated by the electric motor 16 and excess current can be used to power the eddy current brake 10. At low speeds (for example below 32 km/h) both the regenerative braking torque from the electric motor 16 and the braking torque from the eddy current brake 10 will decrease to a point where additional friction braking from a friction brake 34 may be required. The electronic controller 24 apportions the requirements of braking torque to each of the components of the vehicle braking system in relation to the instantaneous vehicle speed.

For purposes of this disclosure, it is to be understood that the controller(s) and/or controller means described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

The blocks illustrated in FIG. 3 may represent steps in a method and/or sections of code in the computer program. The illustration of a particular order to the blocks does not necessarily imply that there is a required or preferred order for the blocks and the order and arrangement of the block may be varied. Furthermore, it may be possible for some steps to be omitted.

It will be appreciated that various changes and modifications can be made to the present invention without departing from the scope of the present application.

As used herein 'for' should be considered to also include 'configured or arranged to'. For example 'a system for' should be considered to also include 'a system configured or arranged to'.

Where a structural feature has been described, it may be replaced by means for performing one or more of the functions of the structural feature whether that function or those functions are explicitly or implicitly described.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed. For example, the described eddy current brake may be applied to applications other than vehicles, for example for braking systems in industrial machines which comprise rotating parts which require braking or retardation.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A vehicle braking system comprising:
   an eddy current brake for a vehicle, the eddy current brake comprising:
      a rotor; and
      an electromagnet arranged to receive current from an electromechanical energy generating means during braking of the vehicle and to induce an eddy current within the rotor;
   the vehicle braking system comprising a controller means arranged to:
      control an amount of current to be provided to the electromagnet of the eddy current brake from the electromechanical energy generating means;
      determine an amount of current generation provided by the electromechanical energy generating means;
      determine an amount of current to be provided to an energy storage means from the electromechanical energy generating means in dependence, at least in part, upon the current generation provided by the electromechanical energy generating means;
      determine an amount of current to be provided to the electromagnet of the eddy current brake from the electromechanical energy generating means in dependence, at least in part, upon a limit for a rate of current absorption for the energy storage means, wherein the limit for the rate of current absorption for the energy storage means is a maximum rate at which the energy storage means can be charged;
      allow the electromechanical energy generating means to provide all of a driver demanded deceleration when the current generation provided by the electromechanical energy generating means is below the limit for the rate of current absorption for the energy storage means; and to
      allow provision of current to the electromagnet of the eddy current brake when the current generation provided by the electromechanical energy generating means exceeds the limit for the rate of current absorption for the energy storage means.

2. The vehicle braking system according to claim 1, wherein the electromechanical energy generating means is an electric motor operating as a generator during braking of the vehicle.

3. The vehicle braking system according to claim 1, wherein the controller means is an electronic controller.

4. The vehicle braking system according to claim 1, wherein the controller means is arranged to determine the amount of current to be provided to the electromagnet of the eddy current brake from the electromechanical energy generating means in dependence, at least in part, upon the current generation provided by the electromechanical energy generating means.

5. The vehicle braking system according to claim 1 wherein the energy storage means is a battery.

6. The vehicle braking system according to claim 1, wherein the controller means is arranged to receive an input from an energy storage state monitor providing an energy storage state value of the energy storage means.

7. The vehicle braking system according to claim 6, wherein the controller means is arranged to determine the amount of current to be provided to the electromagnet of the eddy current brake from the electromechanical energy generating means in dependence, at least in part, upon the energy storage state value.

8. The vehicle braking system according to claim 1, wherein the controller means is arranged to receive an input from a brake pedal position sensor providing a brake pedal position value corresponding to the driver demanded deceleration and to determine the amount of current to be provided to the electromagnet of the eddy current brake from the electromechanical energy generating means in dependence, at least in part, upon the brake pedal position value.

9. The vehicle braking system according to claim 1, wherein the controller means is arranged to receive an input from a speed sensor providing a vehicle speed value, and to determine the amount of current to be provided to the electromagnet of the eddy current brake from the electromechanical energy generating means in dependence, at least in part, upon the vehicle speed value.

10. The vehicle braking system according to claim 1, comprising the electromechanical energy generating means arranged to provide current to the electromagnet of the eddy current brake.

11. The vehicle braking system according to claim 1, comprising an energy storage means for receiving current from the electromechanical energy generating means.

12. The vehicle braking system according to claim 1, wherein the controller means is arranged to determine an amount of braking torque to be provided by a friction brake.

13. The vehicle braking system according to claim 12, wherein the friction brake is arranged to be actuated during a braking event, prior to the eddy current brake receiving current from the electromechanical energy generating means.

14. The vehicle braking system according to claim 12, wherein the friction brake is actuated when a vehicle speed is below a threshold speed.

15. The vehicle braking system according to claim 1, wherein the electromechanical energy generating means is provided on a first vehicle axle and the eddy current brake is provided on a second vehicle axle.

16. The vehicle braking system as claimed in claim 1 implemented in a vehicle.

17. A method for braking a vehicle, comprising:
   Controlling an amount of current to be provided to an electromagnet of an eddy current brake from an electromechanical energy generating means during braking of the vehicle;
   determining an amount of current generation provided by the electromechanical energy generating means;
   determining an amount of current to be provided to an energy storage means from the electromechanical energy generating means in dependence, at least in part, upon the current generation provided by the electromechanical energy generating means;
   determining an amount of current to be provided to the electromagnet of the eddy current brake from the electromechanical energy generating means in dependence, at least in part, upon a limit for a rate of current absorption for the energy storage means, wherein the limit for the rate of current absorption for the energy storage means is a maximum rate at which the energy storage means can be charged;
   allowing the electromechanical energy generating means to provide all of a driver demanded deceleration when the current generation provided by the electromechanical energy generating means is below the limit for the rate of current absorption for the energy storage means; and
   allowing provision of current to the electromagnet of the eddy current brake when the current generation provided by the electromechanical energy generating means exceeds the limit for the rate of current absorption for the energy storage means.

18. A non-transitory computer readable medium having stored thereon a computer program comprising instructions that, when executed by one or more processors, cause a system to perform, at least:
controlling an amount of current to be provided to an electromagnet of an eddy current brake from an electromechanical energy generating means during braking of a vehicle;
determining an amount of current generation provided by the electromechanical energy generating means;
determining an amount of current to be provided to an energy storage means from the electromechanical energy generating means in dependence, at least in part, upon the current generation provided by the electromechanical energy generating means;
determining an amount of current to be provided to the electromagnet of the eddy current brake from the electromechanical energy generating means in dependence, at least in part, upon a limit for a rate of current absorption for the energy storage means, wherein the limit for the rate of current absorption for the energy storage means is a maximum rate at which the energy storage means can be charged;
allowing the electromechanical energy generating means to provide all of a driver demanded deceleration when the current generation provided by the electromechanical energy generating means is below the limit for the rate of current absorption for the energy storage means; and
allowing provision of current to the electromagnet of the eddy current brake when the current generation provided by the electromechanical energy generating means exceeds the limit for the rate of current absorption for the energy storage means.

\* \* \* \* \*